INVENTOR
JAMES J. DYER

April 4, 1950  J. J. DYER  2,503,230
APPARATUS FOR EXTRUDING HOLLOW CYLINDRICAL BODIES
Filed Nov. 24, 1947  2 Sheets-Sheet 2
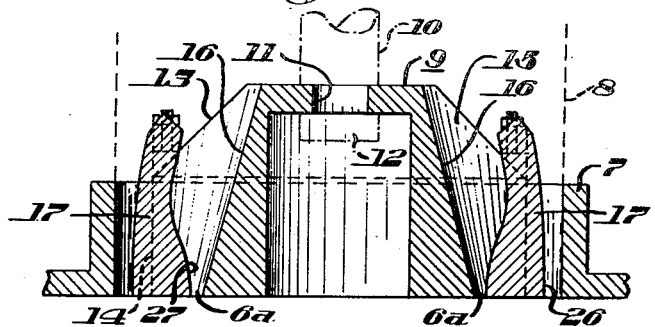
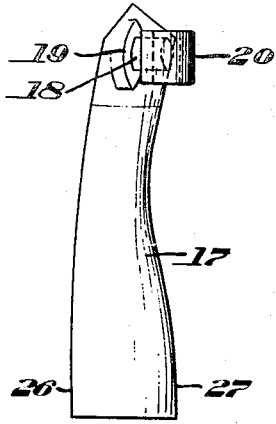
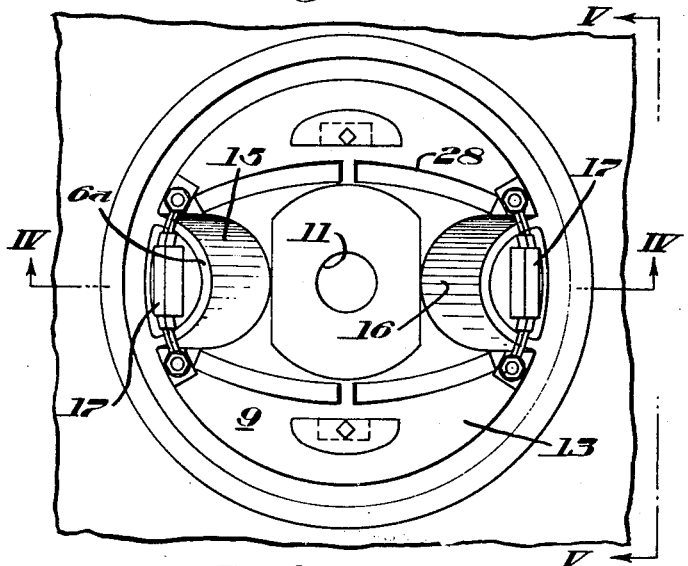
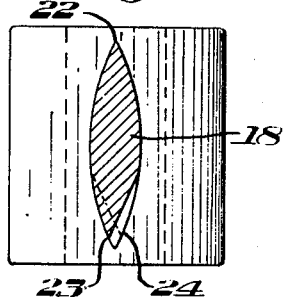
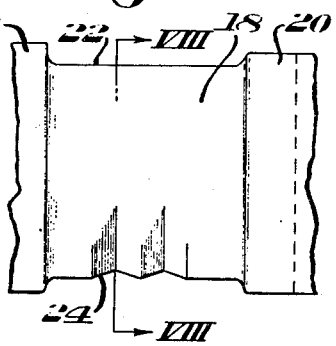
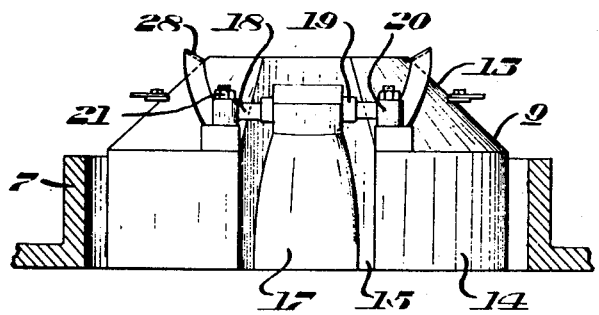
INVENTOR
JAMES J. DYER Patented Apr. 4, 1950

2,503,230

UNITED STATES PATENT OFFICE 2,503,230

APPARATUS FOR EXTRUDING HOLLOW CYLINDRICAL BODIES

James J. Dyer, Toronto, Ohio

Application November 24, 1947, Serial No. 787,637

5 Claims. (Cl. 25—17)

This invention relates to apparatus for extruding hollow cylindrical bodies having an interior baffle formed integrally with the wall of the cylindrical body. The invention will be described particularly as applied to extruding a cylindrical septic tank having an interior baffle formed integrally with the wall of the septic tank. Septic tanks are in reality large diameter pipes open at the top and bottom. Holes are formed in the wall of the tank for inflow and outflow of sewage. Semi-cylindrical baffles are provided adjacent the openings in the wall to control the flow of the sewage. In the past, these baffles have been made by longitudinally severing a length of clay pipe while still in a plastic condition, adhering the section of the pipe in position adjacent each opening in the septic tank and then firing the tank and piece of pipe forming the baffle in order to cause them to be permanently joined together.

The present invention provides an apparatus for simultaneously extruding the septic tank and the baffle so that the baffle is formed integrally with the septic tank, thus avoiding the necessity of separately forming the baffle and adhering it to the tank. Furthermore, due to the integral formation of the tank and baffle, the product is stronger and there is less likelihood of the baffle breaking away from the tank.

In the accompanying drawings which illustrate a preferred embodiment of my invention, Figure 1 is a plan view of a septic tank;

Figure 3 is a plan view of the dies employed in extruding the septic tank with integral baffles;

Figure 4 is a vertical section through the dies taken on the line IV—IV of Figure 3;

Figure 5 is a side elevation of the apparatus shown in Figure 3, the view being taken looking in the direction of the arrows V—V of Figure 3, the outer die being shown in section;

Figure 6 is a side elevation of one of the cores for forming an opening in a baffle;

Figure 7 is an elevation, to an enlarged scale, of one of the arms for supporting the core shown in Figure 6; and Figure 8 is a vertical section taken on the line VIII—VIII of Figure 7.

Figure 1:
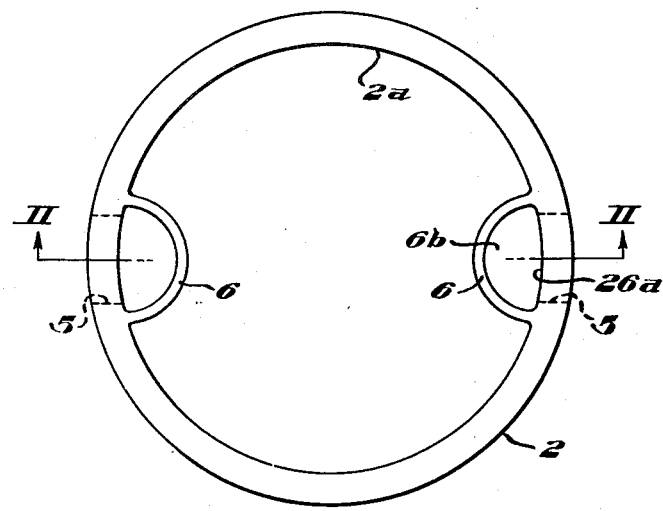
Figure 2:
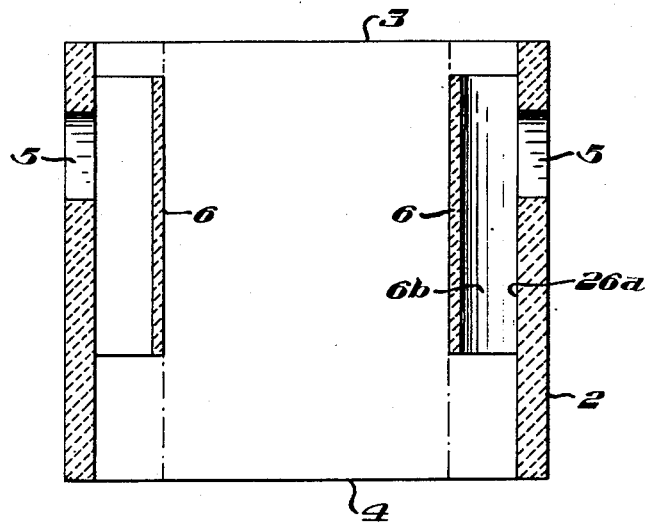
Figure 2 is a vertical longitudinal section taken on the line II—II of Figure 1.

Referring more particularly to the accompanying drawings, the septic tank indicated generally by the reference numeral 2 is open at its top 3 and at its bottom 4. It is provided with two openings 5 for the inflow and outflow of sewage. Two semi-cylindrical baffles 6 are extruded simultaneously with the extrusion of the septic tank and after the extrusion is completed, the baffles are cut off to the desired length.

Referring to Figures 4 through 8, a cylindrical outer die 7 is connected to a clay press 8 in a known manner. An inner die 9 also is connected to the clay press 8 in a known manner by means of a shaft 10 having a reduced portion 11 fitting in a bore of the inner die and also having an enlarged portion 12 contacting with the interior surface of the inner die. Since this construction is known, it is not illustrated in detail in the drawings.

The inner die 9 has a frusto-conical top portion 13 and a cylindrical lower portion 14 as shown more particularly in Figure 5. The inner die 9 is provided with two diametrically located grooves 15. These grooves are downwardly contracting grooves, i. e., the surface 16 of the groove slopes downwardly and outwardly as best seen in Figure 4 so that the groove has a relatively large area adjacent its top and a relatively small area adjacent its bottom. These downwardly contracting grooves cause the clay which is extruded between the inner and outer dies to be compacted within the grooves.

A core 17 is located in each of the grooves 15. Each core is connected to two arms 18 having an inner boss 19 connected to the upper end of the core and an outer boss 20 connected by a bolt and nut 21 to the inner die 9. Thus a core 17 is suspended in each of the recesses 15 of the inner die 9.

Each of the arms 18 which supports a core has a sharp upper edge 22 and a sharp lower edge 23 as shown in Figures 7 and 8. These sharp edges cause the clay being extruded to closely follow the arms in passing them so as to prevent voids being formed in the clay. The lower edge 23 of the arms is corrugated as indicated by the reference numeral 24, these corrugations acting further to prevent the formation of voids and to heal the clay as it passes the lower edge of the arm.

The outer surface 26 of the core 17 is cylindrical in shape and of substantially the same contour as the interior cylindrical surface 2a of the septic tank 2. Thus when clay or other plastic material is placed in the press 8 and extruded through the dies, the surface 26 of the core 17 forms the portion 26a (see Figure 1) of the inner surface 2a of the septic tank. Each baffle 6 is formed in the space 6a between the groove 15 in the inner die and the inner surface 27 of the core 17. The body of the core forms the opening 6b in the baffle.

Vanes 20, shown in Figures 3 and 5, are supported on the inner die 9 and are so arranged as to cause the clay being delivered from the clay press to be compressed into the grooves 15. The vanes 20 for guiding the clay into the grooves 15, the downwardly contracting grooves 15 and a core 17 having the surface 21 which slopes downwardly and inwardly, all cooperate to compact the clay as it is being extruded and to insure the formation in the space 6a of a baffle 6 which is relatively free from voids.

After the septic tank and the integrally formed baffles have been extruded through the dies, the septic tank is cut off to the desired length and the baffles also are cut off to the desired length which is less than the length of the septic tank. The holes 5 are formed in the tank and the tank is fired.

The invention is not limited to the preferred embodiment but may be otherwise embodied or practiced within the scope of the following claims.

I claim:

1. In apparatus for extruding a hollow cylindrical body having interior baffles formed integrally with the wall of the cylindrical body, a cylindrical outer die for forming the outer wall of the cylindrical body, an inner die for forming the inner wall of the cylindrical body, the inner die having two diametrically located grooves, and a core located in each groove for forming an opening in a baffle, the cross sectional area of each groove decreasing toward the base of the core.

2. In apparatus for extruding a hollow cylindrical body having interior baffles formed integrally with the wall of the cylindrical body, a cylindrical outer die for forming the outer wall of the cylindrical body, an inner die for forming the inner wall of the cylindrical body, the inner die having a frusto-conical upper portion and a cylindrical lower portion, the inner die having two diametrically located grooves, and a core located in each groove for forming an opening in a baffle, the cross sectional area of each groove decreasing toward the base of the core.

3. In apparatus for extruding a hollow cylindrical body having interior baffles formed integrally with the wall of the cylindrical body, a cylindrical outer die for forming the outer wall of the cylindrical body, an inner die for forming the inner wall of the cylindrical body, the inner die having a frusto-conical upper portion and a cylindrical lower portion, the inner die having two diametrically located grooves, and a core located in each groove for forming an opening in a baffle, the cross sectional area of each groove decreasing toward the base of the core, each core having an outer cylindrical surface for forming that portion of the inner surface of the cylindrical body which lies adjacent a groove.

4. In apparatus for extruding a hollow cylindrical body having interior baffles formed integrally with the wall of the cylindrical body, a cylindrical outer die for forming the outer wall of the cylindrical body, an inner die for forming the inner wall of the cylindrical body, the inner die having a frusto-conical upper portion and a cylindrical lower portion, the inner die having two diametrically located grooves and a core located in each groove for forming an opening in a baffle, the cross sectional area of each groove decreasing toward the base of the core, each core having an outer cylindrical surface for forming that portion of the inner surface of the cylindrical body which lies adjacent a groove, the lower portion of the inner surface of each core sloping downwardly and inwardly so as to compress the material being extruded against the surface of the groove in the inner die.

5. In apparatus for extruding a hollow cylindrical body having interior baffles formed integrally with the wall of the cylindrical body, a cylindrical outer die for forming the outer wall of the cylindrical body, an inner die for forming the inner wall of the cylindrical body, the inner die having a frusto-conical upper portion and a cylindrical lower portion, the inner die having two diametrically located grooves, the cross sectional area of each groove decreasing toward the base of the core, vanes carried by the inner die for forcing material being extruded into the grooves, a core located in each groove for forming an opening in a baffle, each core being connected adjacent its upper end to arms supported on the inner die, each arm having sharp upper and lower edges, the lower edge of each arm being corrugated to heal the material being extruded after passing the arms, the lower portion of the inner surface of each core sloping downwardly and inwardly so as to compress the material being extruded against the surface of the groove in the inner die.

JAMES J. DYER.

REFERENCES CITED

The following references are of record in the file of this patent:

UNITED STATES PATENTS

| Number | Name | Date |
|---|---|---|
| 170,841 | Freeman | Dec. 7, 1875 |
| 1,957,056 | Whitacre | May 1, 1934 |

FOREIGN PATENTS

| Number | Country | Date |
|---|---|---|
| 124,859 | Austria | Oct. 10, 1931 |
| 646,458 | Germany | June 14, 1937 |